United States Patent
Watanabe Bavaresco et al.

(10) Patent No.: US 11,965,580 B2
(45) Date of Patent: Apr. 23, 2024

(54) TUNABLE VISCOELASTIC NEUTRALIZER WITH OSCILLATING MASS ON SHAFT FOR CONTROL OF VIBRATIONS IN PIPES IN GENERAL

(71) Applicants: Universidade Federal Do Parana, Curitiba (BR); Petroleo Brasileiro S.A.—Petrobras, Rio de Janeiro (BR)

(72) Inventors: Milena Watanabe Bavaresco, Skjern (DK); Thiago Da Silva, Araucária (BR); Gabriel De Almeida Pereira, Curitiba (BR); Alex Geraldo Rodrigues Do Pilar, Colombo (BR); José Eduardo Gubaua, Araucária (BR); Jucélio Tomás Pereira, Curitiba (BR); Eduardo Márcio De Oliveira Lopes, Curitiba (BR); Carlos Alberto Bavastri, Curitiba (BR); Jorivaldo Medeiros, Rio de Janeiro (BR); Rodrigo Andre Hoppe, Jardim Motorama (BR); Joilson De Souza Rangel Junior, Rio de Janeiro (BR); Claudio De Oliveira Mendonça, Rio de Janeiro (BR); Carlos Akio Soki, Rio de Janeiro (BR); Andre Albuquerque Thomas E Brandão, Rio de Janeiro (BR)

(73) Assignees: Universidade Federal Do Parana, Curitiba (BR); Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/862,589

(22) Filed: Jul. 12, 2022

(65) Prior Publication Data
US 2023/0018936 A1 Jan. 19, 2023

(30) Foreign Application Priority Data
Jul. 12, 2021 (BR) ...................... 10 2021 013714 2

(51) Int. Cl.
*F16F 7/108* (2006.01)
*F16F 7/112* (2006.01)

(52) U.S. Cl.
CPC ........... *F16F 7/112* (2013.01); *F16F 2222/08* (2013.01); *F16F 2228/066* (2013.01); *F16F 2232/08* (2013.01); *F16F 2234/02* (2013.01)

(58) Field of Classification Search
CPC .. F16F 7/104; F16F 7/108; F16F 7/112; F16F 2222/08; F16F 2228/066; F16F 2232/08; F16F 2234/02
See application file for complete search history.

(56) References Cited

U.S. PATENT DOCUMENTS

| | | | | |
|---|---|---|---|---|
| 4,852,848 A | * | 8/1989 | Kucera | F16F 7/104 188/380 |
| 4,962,826 A | * | 10/1990 | House | F16L 55/0335 181/207 |

(Continued)

FOREIGN PATENT DOCUMENTS

| | | |
|---|---|---|
| CA | 2286986 A1 | 4/2000 |
| CN | 103443498 A | 12/2013 |

(Continued)

*Primary Examiner* — Thomas W Irvin
(74) *Attorney, Agent, or Firm* — Mintz, Levin, Cohn, Ferris, Glovsky and Popeo, P.C.

(57) ABSTRACT

A dynamic viscoelastic vibration neutralizer for industrial pipes includes a metallic housing, to which the shaft supports are fixed, by screws. The supports of the viscoelastic pieces and the supports of the housing itself, allow the junction of the device with the system to be controlled. An oscillating mass, fixed in the center of a metallic shaft, is supported by the shaft supports. two sets of viscoelastic (Continued)

pieces, are fixed by one of their ends to the supports of the viscoelastic pieces and by the other to the oscillating mass.

5 Claims, 5 Drawing Sheets

(56) References Cited

U.S. PATENT DOCUMENTS

| | | | | |
|---|---|---|---|---|
| H1317 H | * | 6/1994 | Ng | 181/207 |
| 5,366,198 A | * | 11/1994 | Dickinson | F16F 15/04 |
| | | | | 248/603 |
| 6,129,177 A | * | 10/2000 | Gwinn | F16F 7/108 |
| | | | | 181/207 |
| 6,397,988 B1 | * | 6/2002 | Ptak | F16F 1/505 |
| | | | | 188/380 |
| 9,500,247 B2 | * | 11/2016 | Song | F16L 55/041 |
| 11,078,980 B2 | * | 8/2021 | Higuchi | F16F 15/02 |
| 11,492,773 B2 | * | 11/2022 | Lund | E02B 17/0017 |
| 2012/0103739 A1 | * | 5/2012 | Song | F16F 7/104 |
| | | | | 188/378 |
| 2014/0262656 A1 | * | 9/2014 | Song | F16F 7/116 |
| | | | | 188/378 |
| 2020/0309225 A1 | * | 10/2020 | Fan | F16F 7/116 |

FOREIGN PATENT DOCUMENTS

| | | |
|---|---|---|
| CN | 105570545 A | 5/2016 |
| CN | 105972370 A | 9/2016 |
| CN | 106122605 A | 11/2016 |
| CN | 106704761 A | 5/2017 |
| CN | 111350899 A | 6/2020 |
| CN | 211502020 U | 9/2020 |
| CN | 212131705 U | 12/2020 |
| CN | 212226389 U | 12/2020 |
| CN | 212226398 U | 12/2020 |

* cited by examiner

TUNABLE VISCOELASTIC NEUTRALIZER WITH OSCILLATING MASS ON SHAFT FOR CONTROL OF VIBRATIONS IN PIPES IN GENERAL

CROSS-REFERENCE TO RELATED APPLICATION

This application claims priority to Brazilian Application No. 10 2021 013714 2, filed on Jul. 12, 2021, and entitled "TUNABLE VISCOELASTIC NEUTRALIZER WITH OSCILLATING MASS ON SHAFT FOR CONTROL OF VIBRATIONS IN PIPES IN GENERAL," the disclosure of which is incorporated herein by reference in its entirety.

FIELD OF THE INVENTION

The present patent of invention addresses to a tunable viscoelastic dynamic vibration neutralizer to reduce mechanical vibrations existing in various pipelines, considering their industrial requirements and international standards of admissible vibration levels. Pipelines such as those mentioned above are found, among other places, in oil refineries, in food and pharmaceutical plants and in chemical industries in general. They are used, as a rule, in the distribution of gases, water, oils and industrial liquids.

The neutralizer can and must be tuned by adjusting its components to ensure a considerable reduction in the vibration levels of the pipeline to be controlled, respecting the maximum acceptable levels for this type of industrial structure. The technology of the present invention incorporates a damping system, consisting of a movement energy dissipating material, that is, a set of elastomers; a flexible elastic system, consisting of a bi-supported metallic shaft; and a metallic inertial system, defined by an oscillating mass allocated in the same geometric center of the shaft.

The elastomer of the present patent, in addition to dissipating movement energy, offers flexibility to the metallic elastic-inertial system, constituted by the association of the bi-supported shaft and the oscillating mass fixed to the same. Thus, there is a dynamic system that responds to the movement of the pipeline, with a vibration reduction to acceptable levels, by the dissipation and redistribution of the associated energy. The elastomer elements of the neutralizer in the present patent application are made from a single type of elastomeric material.

BACKGROUND

Thin-walled tubes—pipes—are an important part of the logistic chain in a variety of systems involved, for example, in the exploration, production and distribution of oil, natural gas and their by-products. The vibration of these components can lead to fatigue damage to the pipeline profile and damage to pipeline supports. The generation of vibration in the tubes, in general, occurs due to the excitation by external factors—such as pumps and compressors—and also by internal factors—movement of the circulating fluid. Regardless of the type of excitation, critical vibration problems can occur, when exciting a mechanical system with a force whose spectrum reaches one or several of its natural frequencies. In some cases, the interaction between the fluid and the pipes can also cause unwanted dynamic instabilities.

Classically, there are several techniques for reducing mechanical vibrations in pipes. One of them is the pure and simple inclusion of damping by means of the use of viscous and/or viscoelastic devices in metallic supports, which are used to replace metallic supports or in supports additional to the pipeline. Following this strategy, the following patents can be mentioned:

| Author | Patent | Origin | Technique |
| --- | --- | --- | --- |
| Huang Xinghuai<br>Miao Annan<br>Wang Cheng<br>Wang Junjian<br>Xu Zhaodong | CN106704761A | China | Viscoelastic Support |
| Guo Xin<br>Ji Fang<br>Wang Feng<br>Wu Ming | CN211502020U | China | Viscoelastic Support |
| Fan Liming<br>Gao Guanxing<br>Huang Weiwei<br>Jin Canjie<br>Zhou Guosheng | CN111350899A | China | Viscous Support |

Another strategy used is the addition of damping in the pipes themselves, by coupling devices basically comprising viscoelastic material, at the points of greater deformation. The following patents address to this class of devices:

| Author | Patent | Origin |
| --- | --- | --- |
| Yu Ningning | CN212131705U | China |
| Yu Ningning | CN212226389U | China |
| Yu Ningning | CN212226398U | China |

Another method, which does not need to connect the system to the ground by means of a material capable of dissipating vibratory energy or damper, is the use of dynamic vibration neutralizers, also known as dynamic vibration absorbers, which are fixed to the vibrating pipeline. These devices work by applying reaction forces and/or promoting the dissipation of vibratory energy. Among the dynamic neutralizers used in pipes, the most common are the spring-mass neutralizers and the mass-viscoelastic material neutralizers.

In spring-mass neutralizers, the action of reducing vibration occurs due to the interaction between an elastic (spring) and an inertial (mass) component, producing a high vibration control, with the action occurring, however, in a narrow band of frequencies. Some patents for this type of device are listed below.

| Author | Patent | Origin |
| --- | --- | --- |
| James T. Gwinn | CA2286986A1 | US |
| Lei Ting<br>Liang Wei<br>Lin Yang<br>Qiu Jingwei<br>Yuan Qi<br>Zhang Laibin<br>Zhang Meng | CN105570545A | China |
| Chen Zhaoji<br>Liu Hong<br>Wang Yuping<br>Zhang Zhenli<br>Zhou Fuchang | CN106122605A | China |

Viscoelastic dynamic neutralizers work in a similar way to those mentioned above. However, in this case, a viscoelastic component is used, which in addition to introducing an important amount of damping to the device, adds a certain amount of elasticity to the same. That is, it has the ability to store elastic energy and acts as a spring and a damper simultaneously. One of the main advantages of viscoelastic neutralizers is the possibility of reducing vibrations in a wide frequency range, due to the viscoelastic component. In this category of neutralizers, different types of devices can be encompassed, such as those described in the following patents:

| Author | Patent | Origin |
|---|---|---|
| Li Luyu<br>Mo Yi-Lung<br>single Mithun<br>Song Gangbing | CN103443498A | China |
| Du Jingtao<br>Liu Xueguang<br>Ma Teng<br>Wu Dengfeng<br>Yang Tiejun | CN105972370A | China |

The use of vibration neutralizers stands out among the other methods, as it does not depend on the knowledge of the sources of vibration, but rather on their spectrum or frequency range. Knowing the dynamic characteristics of the primary system—in this case, the pipes—it is possible to reduce the amplitudes of vibrations to acceptable limits, reducing the risk of critical damage and prolonging the life of the systems under control.

DESCRIPTION OF FIGURES

FIG. 6—Shows a top and front view of the tunable viscoelastic neutralizer for pipes in general, as shown in FIG. 1; however, here

DETAILED DESCRIPTION

Figure 1:
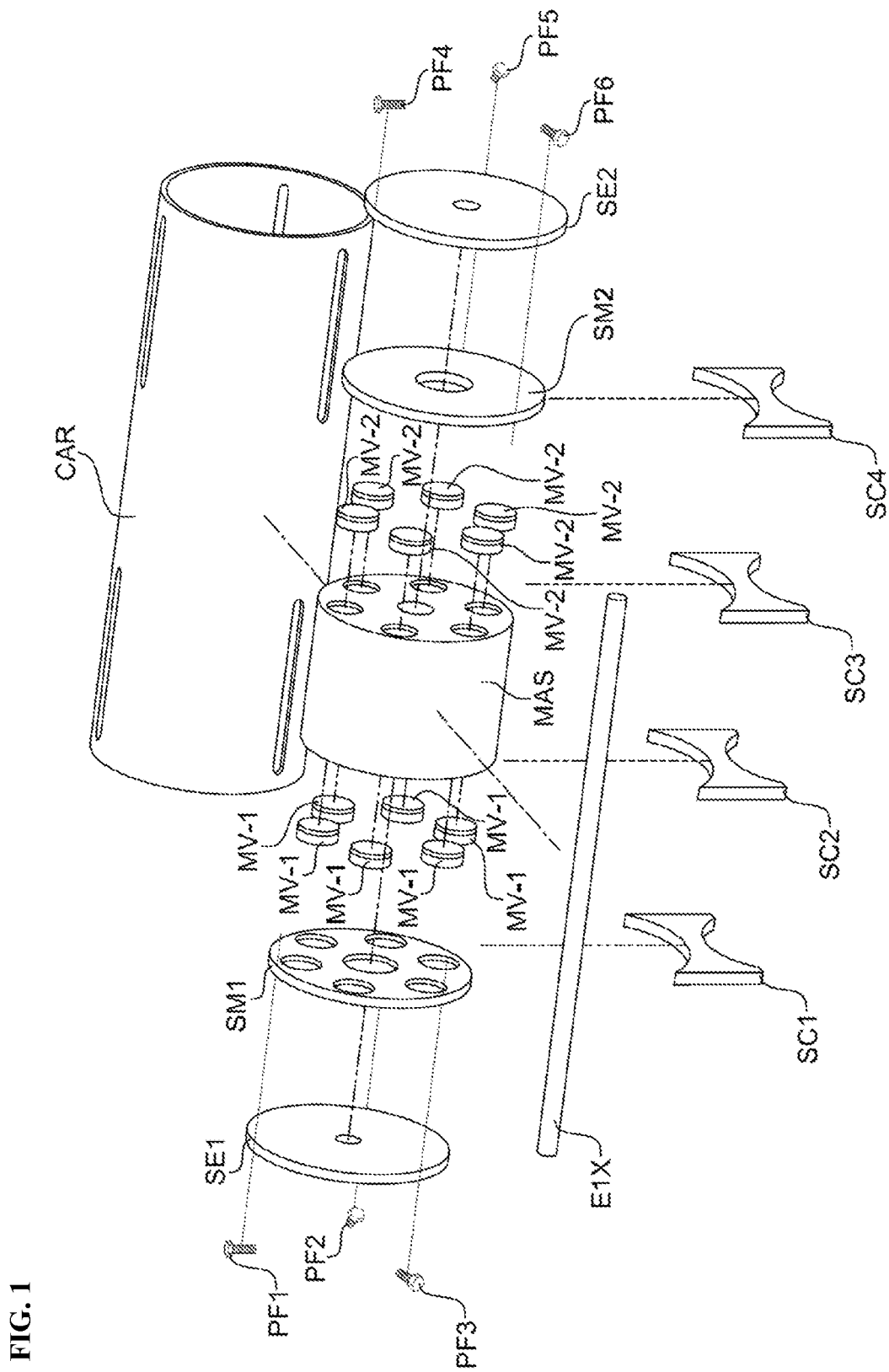
FIG. 1—Shows a top and front view of the tunable viscoelastic neutralizer with oscillating mass on shaft for vibration control in pipes in general, where it is seen in an exploded view, consisting of: a housing (CAR), an oscillating mass (MAS), one shaft (EIX), six viscoelastic pieces (MV-1), six viscoelastic pieces (MV-2), two supports of the viscoelastic pieces (SM1 and SM2), two shaft supports (SE1 and SE2), six screws of fixing the shaft supports (PF1, PF2, PF3, PF4, PF5 and PF6) and four housing supports (SC1, SC2, SC3 and SC4), which join the device with the pipes (system in vibration).
Figure 2:
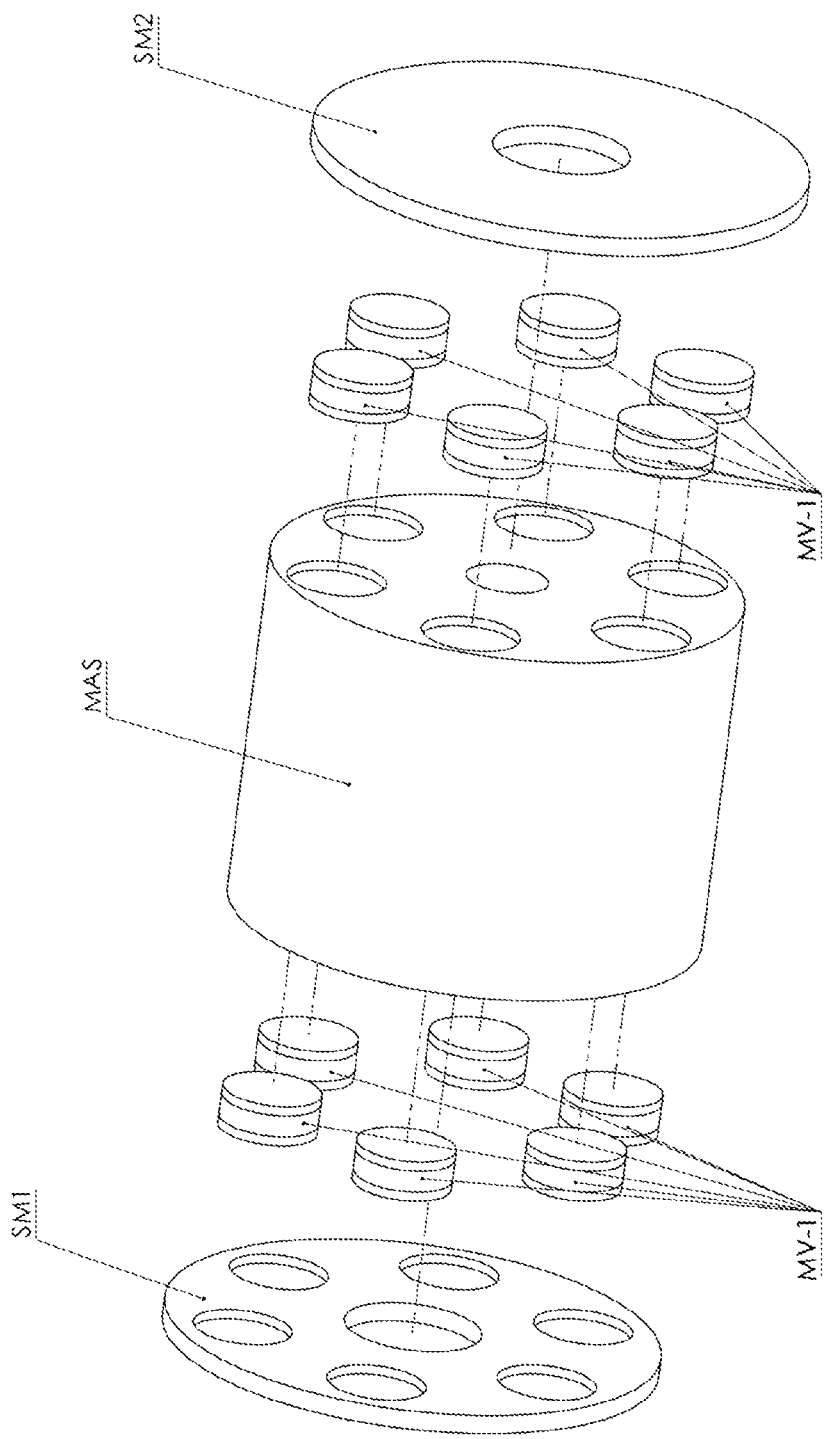
FIG. 2—Shows an exploded top and front view of the tunable viscoelastic neutralizer for pipes in general, contained in FIG. 1, highlighting the following components: the oscillating mass (MAS), the six viscoelastic pieces (MV-1), the six viscoelastic pieces (MV-2), and the two supports of the viscoelastic pieces (SM1 and SM2).
Figure 3:
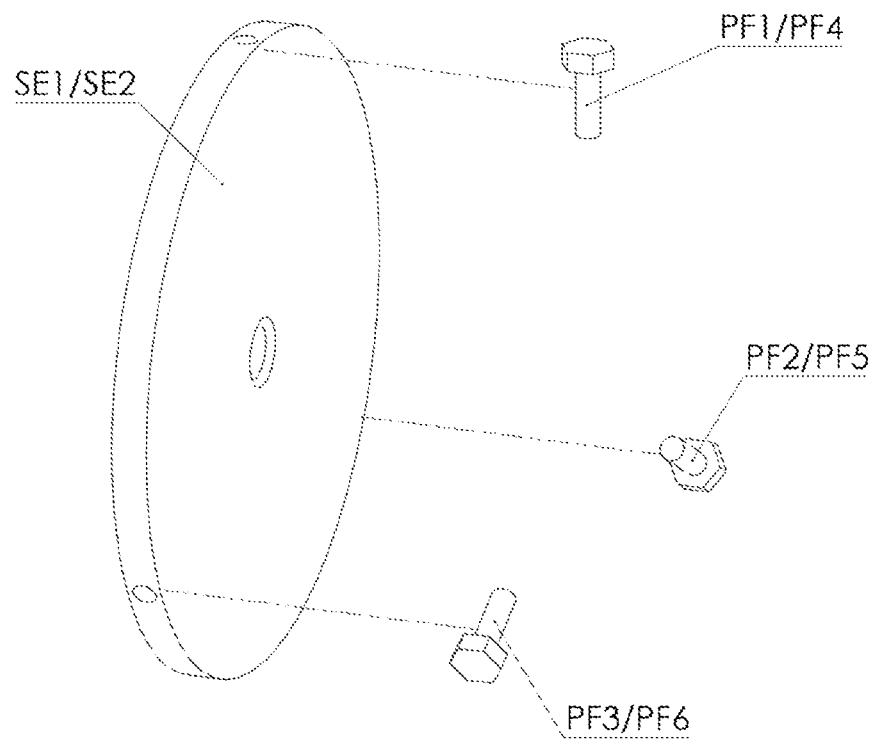
FIG. 3—Shows a top and front view, highlighting the following components of the tunable viscoelastic neutralizer for pipes in general: a shaft support (SE1/SE2), and their respective fixing screws in the housing (PF1/PF4, PF2/PF5 and PF3/PF6).
Figure 4:
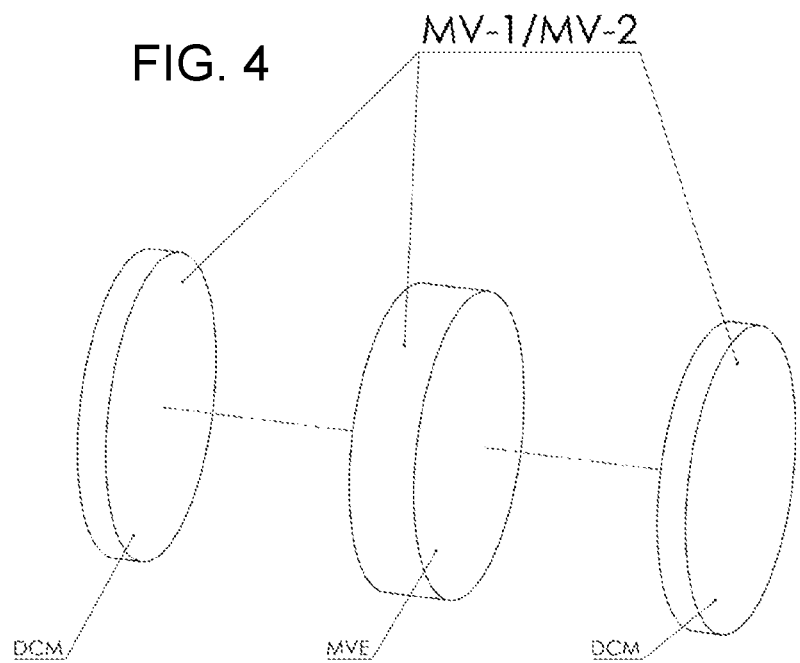
FIG. 4—Shows a highlighted exploded top and front view of the viscoelastic pieces (MV-1/MV-2) of the tunable viscoelastic neutralizer for pipes in general, with its subcomponents: two cylindrical disks (DCM) and a cylindrical element of viscoelastic material (MVE).
Figure 5A:
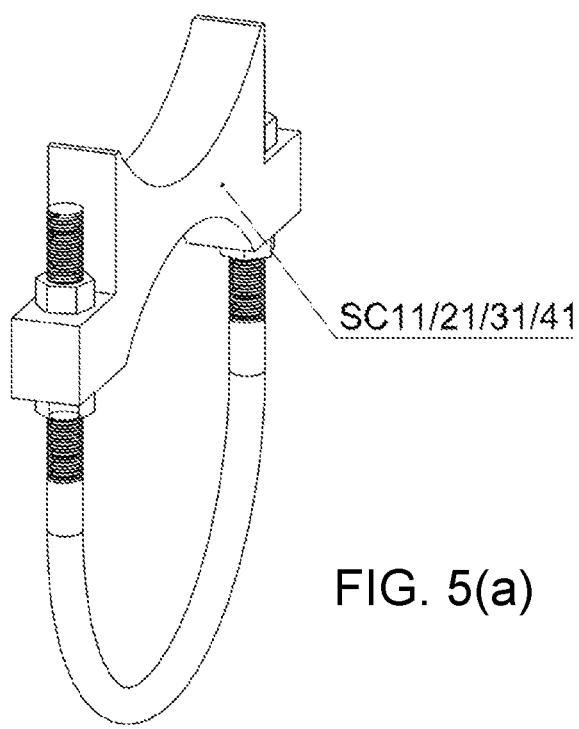
FIG. 5—Shows alternative housing supports in a top and front view, referred to as SC11, SC21, SC31 and SC41, as shown in FIG. 5(a), which can be used instead of or combined with the housing supports SC1, SC2, SC3 and SC4, already with "U"-type metallic clamps, for direct fixing of the neutralizer in the pipe (system in vibration).
FIG. 5(b) shows, in an exploded top and front view, that the alternative housing supports consist of bases, SC11-S, SC21-S, SC31-S and SC41-S, clamps, SC11-U, SC21-U, SC31-U and SC41-U and fixing threads, SC11-R1, SC11-R2, SC11-R3, SC11-R4, SC21-R1, SC21-R2, SC21-R3, SC21-R4, SC31-R1, SC31-R2, SC31-R3, SC31-R4, SC41-R1, SC41-R2, SC41-R3 and SC41-R4.
Figure 5B:
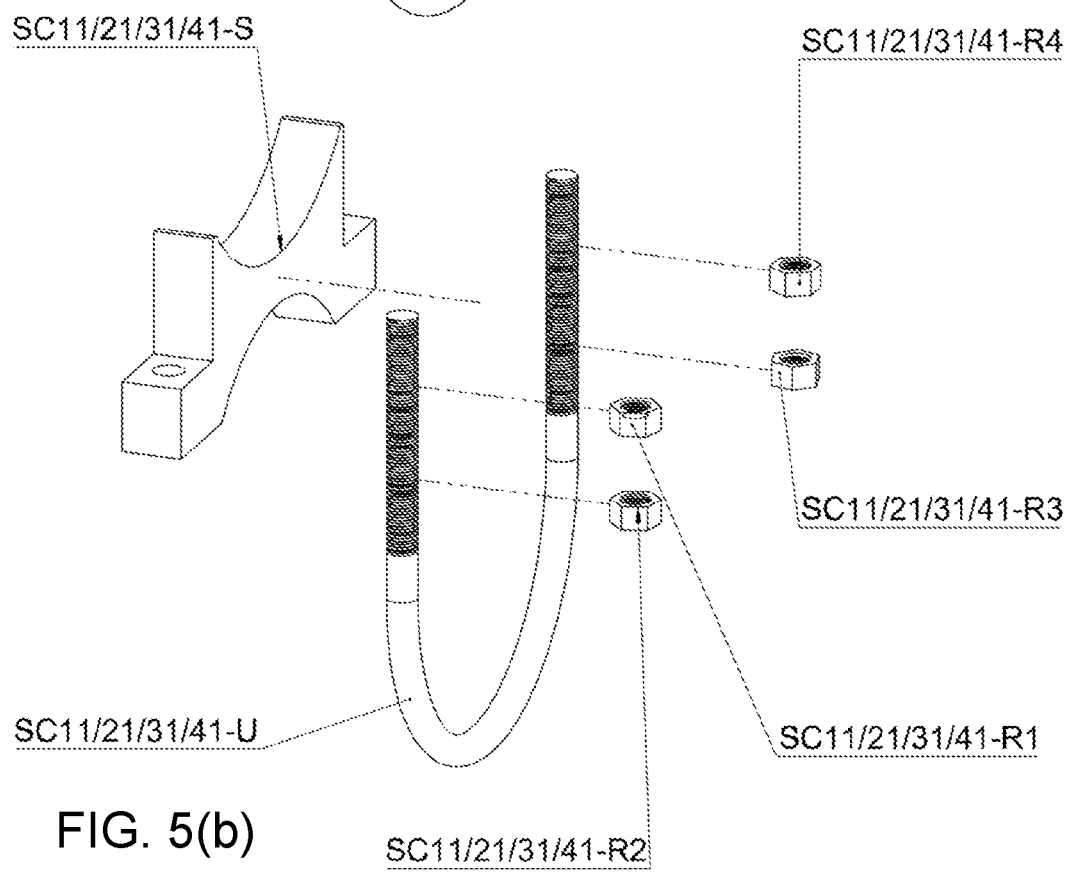
Figure 6A:
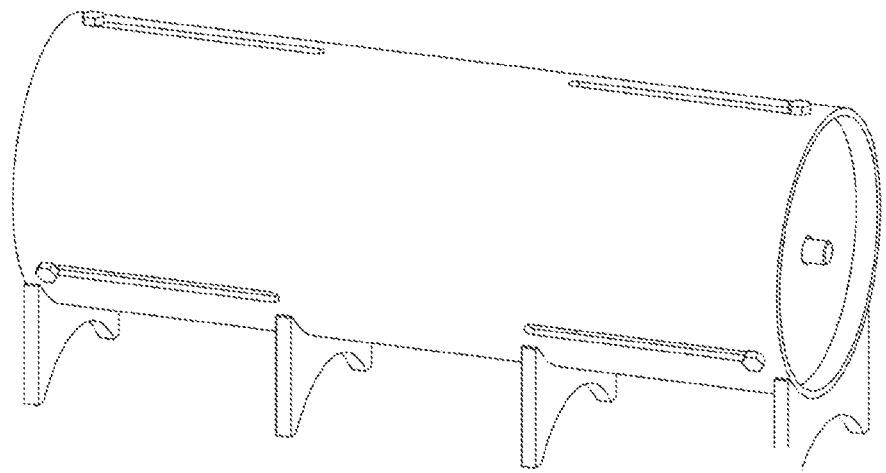
FIG. 6(a) shows an external view of the fully assembled neutralizer and FIG. 6(b) shows the neutralizer assembled, with its hidden edges.
Figure 6B:
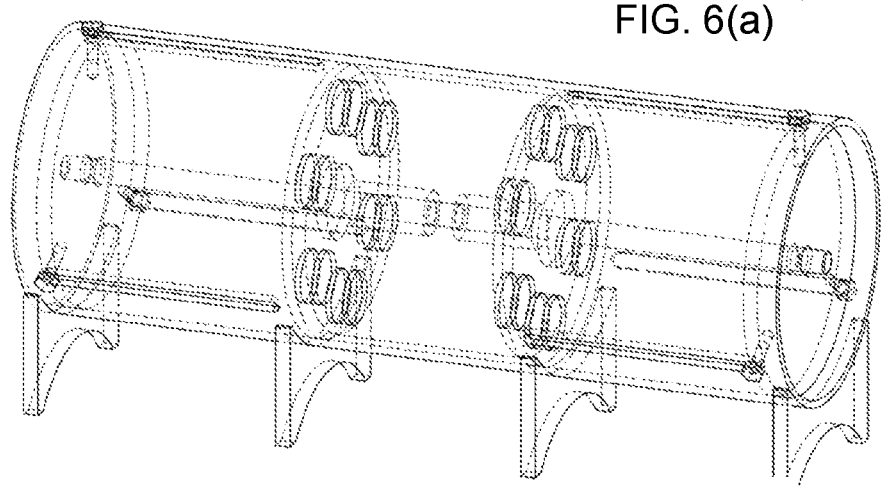
Figure 6C:
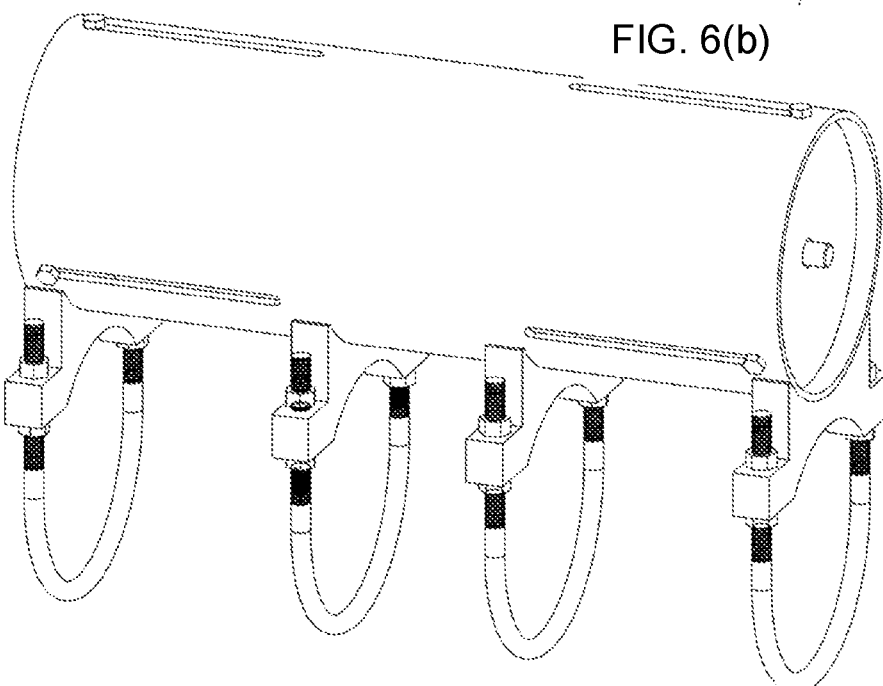
FIG. 6(c) shows the neutralizer assembled using the alternative housing supports.

Most of the devices for reducing vibration in pipes and pipelines are devices to control vibration in a narrow band (spring-mass devices) or that just add damping to the system.

In addition, in the case of devices with elastomeric materials used for this purpose, most of them do not present an effective action in frequency broadbands, as they do not explore, in a precise and optimized way, the factors that influence the particular dynamic characteristics of the elastomers used, such as excitation frequency and ambient temperature.

Another point to be highlighted is the reduced possibility, or even non-existence, of tuning the existing neutralizers (absorbers). The proper tuning is crucial for the satisfactory performance of the devices and this, often, must be done at the time of application of the devices, demanding ample room for maneuver.

The viscoelastic neutralizer, object of the present patent, stands out in its category for having a system where its elasticity is concentrated in its shaft and in its viscoelastic components, positioned between the oscillating mass of the neutralizer and the base connected to the system, wherein it is intended to mitigate the vibrational energy. This combination of elastic and viscoelastic properties allows a greater adaptability of the device to the various situations that can be found in the field.

In addition, another highlight of the present neutralizer is the possibility of varying the distance of the shaft supports, which allows a wide range for changes in the dynamic characteristics of the neutralizer, in order to promote adequate tuning to the systems to be controlled. There is also the possibility of varying the number of viscoelastic components used in a given situation, thus further expanding the range of use of the device.

In practice, the present viscoelastic neutralizer is designed to work effectively in the entire frequency range of mechanical vibrations that are potentially harmful to the pipes, with a wide and effective possibility of adjusting the device in the field. Accordingly, it can be affirmed that the proper installation of the viscoelastic neutralizers, object of the present invention, substantially reduces the propensity to fatigue failures in pipes, due to the effective reduction of their mechanical vibrations.

Seeking a better solution for the control of vibrations in pipes in a simple, efficient and robust way, the inventors added new and relevant knowledge, which resulted in the design and development of the "TUNABLE VISCOELASTIC NEUTRALIZER WITH OSCILLATING MASS ON SHAFT FOR CONTROL OF PIPE VIBRATIONS IN GENERAL", which performs the control of mechanical vibrations in industrial pipes in a broadband of frequencies, in a direct way, by means of elastic components, due to the influence of the metallic shaft of the same, and viscoelastic components, consisting of a single type of elastomer.

The neutralizer has a design fundamental natural frequency, which can be changed by varying the position of the shaft supports. It is designed in such a way that, in its operation, the viscoelastic components are deformed predominantly by shear, performing a more efficient energy dissipation. It is worth to emphasize that, in this device, the viscoelastic components can be used in different quantities, as long as they are symmetrical in the assembly, independently of the other main components of the device.

The neutralizing device presented, hereinafter simply referred to as a tunable viscoelastic neutralizer for pipes in general, has high self-damping, despite its constructive simplicity. It should be noted, however, that its action does not occur only through dissipation, but also through the redistribution of movement energy.

The use of these neutralizers in industrial pipes allows a wide and comprehensive solution to the vibration problem, thus significantly reducing problems related to excessive mechanical vibrations in pipes, such as, for example, fatigue failures. Among the main advantages of this device, there can also be highlighted the small amount of viscoelastic material used, which is already sufficient to reach the desired levels of performance; the independence of radial orientation in the neutralizer installation; and the use of the same device configuration for multiple pipe sizes.

The characterization of the present patent application is made by means of representative drawings of the intended design for the tunable viscoelastic neutralizer for pipes in general. It is understood that, by them, the product can be fully reproduced by an appropriate technique, allowing the full characterization of the functionality of the claimed object.

From the figures elaborated, which express the best way or preferential way of embodying the now-idealized product, the descriptive part of the specification is grounded on by means of a detailed and consecutive numbering. In the description, aspects that may have been implied by the adopted representation are clarified, in order to clearly determine the claimed protection. These figures are merely illustrative, and may present variations, as long as there is no deviation from what was initially required for the performance of the device.

In agreement with what is illustrated in the figures below, the "TUNABLE VISCOELASTIC NEUTRALIZER WITH OSCILLATING MASS ON SHAFT FOR CONTROL OF VIBRATIONS IN PIPES IN GENERAL" contemplates a device for application in industrial pipelines, subject to unsatisfactory levels of mechanical vibrations, simply called a tunable viscoelastic neutralizer in pipes in general, which consists of a metallic housing (CAR) where the shaft supports (SE1 and SE2) are fixed, by means of the use of the screws (PF1, PF2, PF3, PF4, PF5 and PF6), the supports of the viscoelastic pieces (SM1 and SM2), which are fixed by mechanical interference or chemical adhesion, and the supports of the housing itself (SC1, SC2, SC3 and SC4), which allow the device to be joined to the system to be controlled; an oscillating mass (MAS), which represents the control mass of the neutralizer, and is fixed by mechanical interference or adhesion on a metallic shaft (EIX), which holds a considerable part of the neutralizer control elasticity, being supported by the shaft supports (SE1 and SE2); the two sets of viscoelastic pieces (MV-1 and MV-2), which are symmetrically mounted on the device, between the supports of the viscoelastic pieces (SM1 and SM2) and the oscillating mass (MAS), and secured by chemical adhesion or other preferred means.

The viscoelastic pieces (MV-1 and MV-2) consist of two cylindrical metallic discs, with a cylindrical layer of viscoelastic material between both discs, adhered to them through a process of direct vulcanization and injection. Each metallic disk of the viscoelastic pieces (MV-1 and MV-2) is fixed to a respective support (SM1 and SM2) and to the oscillating mass (MAS). This assembly allows the viscoelastic material to work in shear deformations, which ensures greater effectiveness in using its dynamic properties for the device performance.

The number of viscoelastic pieces (MV-1 and MV-2) and their constructive geometry directly influence the damping, in addition to contributing significantly to the stiffness values associated with the neutralizer. The shaft supports (SE1 and SE2) are movable, being able to slide freely on the shaft (EIX), respecting the possible positioning limit of the screws (PF1, PF2, PF3, PF4, PF5 and PF6) for fixing the position of the supports (SE1 and SE2). This fixing position has a significant influence on the stiffness of the shaft (EIX), which makes an important contribution to the dynamic characteristics of the neutralizer. Furthermore, the values of the oscillating mass (MAS) are also effectively important for the behavior of the neutralizer. The abovementioned factors define, to a greater or lesser extent, the characteristic or specific frequencies of the neutralizers, which can be varied according to the interests of controlling the vibrations in question, provided that the constructive principle of shear prevailing in the viscoelastic components is respected.

Thus, it can be seen, from the disclosure, that the "TUNABLE VISCOELASTIC NEUTRALIZER WITH OSCILLATING MASS ON SHAFT FOR CONTROL OF VIBRATIONS IN PIPES IN GENERAL" is characterized as a device for industrial pipelines, as can be evidenced by the carried-out analyses and by the shown figures, having significant differences regarding the traditional vibration control devices existing in the sectorial market, in addition to constructive and functional technical features quite different from those corresponding to the state of the art.

Due to the offered advantages, and also for encompassing truly innovative features that meet all the requirements of novelty and originality in the genre, the "TUNABLE VISCOELASTIC NEUTRALIZER WITH OSCILLATING MASS ON SHAFT FOR CONTROL OF VIBRATIONS IN PIPES IN GENERAL" presented herein fulfills the necessary and sufficient conditions to deserve the privilege of a Patent of Invention.

The invention claimed is:

1. A tunable viscoelastic neutralizer to control vibrations in pipes, the tunable viscoelastic neutralizer comprising:
   a cylindrical, protective, metallic housing defining three slots each configured to allow viewing into the housing;
   a plurality of housing supports defining a shape that allows for adjustment of positioning between the viscoelastic neutralizer and a pipe configured to receive the viscoelastic neutralizer;
   a metallic, cylindrical shaft positioned in a radial and axial center of the housing;
   a plurality of metallic shaft supports in the shape of a disk, each disk defining a circular hole in a radial center of the disk, the circular hole configured to allow passage of a shaft, each of the disks further defining three threaded connections extending radially inward towards the circular hole and arranged equidistant around a circumferential surface of each of the metallic shaft supports, the threaded connections further arranged to align with the three slots of the housing, the threaded connections configured to receive screws, the threaded connections and screws configured to fix the metallic shaft supports to the housing;

a plurality of viscoelastic pieces, each of the viscoelastic pieces comprising two metallic cylinders joined by a viscoelastic material, each of the metallic cylinders having a height and a diameter, the diameter being less than the height;

an oscillating, metallic, cylindrical mass defining an axially aligned, circular hole configured to center and to allow passage of the shaft therethrough, the mass defining grooves on both axial faces, the grooves configured to receive at least a portion of each of the viscoelastic pieces; and disk-shaped, viscoelastic piece supports each defining an axially aligned, circular hole sized to allow deformation of the shaft caused by the oscillation of the mass, each of the viscoelastic piece supports further defining grooves configured to receive at least a portion of each of the viscoelastic pieces.

2. The tunable viscoelastic neutralizer according to claim 1, wherein the housing, the housing supports, the shaft, the viscoelastic pieces, and the mass, and the viscoelastic piece supports are all fixed in their position relative to one another when not vibrating, wherein only the shaft supports are adjustable to axially slide between the housing and the shaft, positions of the shaft supports being configured to be fixed by the screws, the positioning of the shaft supports configured to set a response frequency of the viscoelastic neutralizer.

3. The tunable viscoelastic neutralizer according to claim 1, wherein an amount of the plurality of viscoelastic pieces is adjustable, the plurality of viscoelastic pieces being arranged radially symmetrically in relation to the oscillating mass.

4. The tunable viscoelastic neutralizer according to claim 1, wherein each of the housing supports form a junction between the neutralizer and the pipe.

5. A method to control radial vibrations in pipes, the method comprising:
   receiving a radial vibration, within a specified frequency range, of a pipe by the viscoelastic neutralizer of claim 1;
   transferring the radial vibrations to the mass by the housing supports, housing, shaft supports, and shaft;
   vibrating the mass, responsive to the transferred vibrations, in a corresponding radial direction of movement;
   generating shear deformations predominant in the viscoelastic pieces responsive to vibrating the mass; and
   dissipating and redistributing at least part of the radial vibration of the pipe in response to the shear deformation.

* * * * *